July 10, 1945.  W. J. DE WITT ET AL  2,379,886

FISHHOOK MAKING MACHINE

Filed July 21, 1942  12 Sheets—Sheet 1

Patented July 10, 1945

2,379,886

UNITED STATES PATENT OFFICE 2,379,886

FISHHOOK MAKING MACHINE

William J. De Witt, Auburn, N. Y., and Ernest L. Ott, Shelton, and William B. Runk, Waterbury, Conn., assignors to Shoe Form Co. Inc., Auburn, N. Y., a corporation of New York Application July 21, 1942, Serial No. 451,792

14 Claims. (Cl. 29—9)

This invention relates to machines for forming articles from wire, and is herein illustrated in connection with a machine for making fishhooks.

Heretofore in the manufacture of fishhooks, it has been customary to make use of several different machines for performing the various forming operations upon a wire blank to produce a hook, the blank being removed from each machine and placed by hand into a machine for performing the succeeding operation. It is an object of the present invention to provide an automatic machine, which is adapted to perform all the necessary operations upon a blank to produce a completed hook without the intervention of the operator, thus contributing to economy in the manufacture of hooks and to uniformity in their quality.

To this end and as illustrated, the invention provides novel mechanism for cutting from a length of wire a blank of predetermined size, successively advancing it from one to another of several stations, at which the blank is pointed, barbed, bent to form an eye at one end of the blank, bent to form a hook at the opposite end of the blank, the hook end of the blank is swaged, and then is twisted or bent laterally to form a skewed hook. It is to be noted that one or more of these operations may be omitted and others may be added, depending upon the type of hook to be produced.

As shown, mechanism is provided by which wire is advanced intermittently to cut-off mechanism, by which a blank of measured length is formed. Novel conveyor means is provided for advancing blanks past grinding rolls which form points thereon, the mechanism comprising an endless belt having fingers for engaging the blanks, and moving them along a work support, together with a second endless belt passing over the blanks and depressed thereagainst to rotate the blanks during their movement past the grinding rolls. This feature is important in that it facilitates the formation of a true taper upon the blanks, avoiding any tendency to form a flat surface as the blanks pass the rolls.

A turret or dial is provided for advancing pointed blanks successively to various hook-forming operating stations, the turret being provided with work-holding devices for securely holding the blanks in fixed relation to the operating tool. The work-holding devices comprise relatively movable jaws, together with means for holding the jaws in clamping position during operations upon blanks held by the jaws, means for rotating the work-holding devices to present the blanks in different positions to the operating tool, and means for releasing the jaws and ejecting the blanks upon completion of operations thereon.

Novel eyeing mechanism is provided comprising cooperating dies successively for performing a preliminary bending operation and for rolling the bent portion to produce an eye.

The barbing mechanism comprises cooperating members specially adapted to maintain the blank in fixed position during operation of a chisel for forming the barb.

The hook portion is preferably formed in two operations by mechanism comprising relatively movable jaws, which grip an end of the blank and bend it into a hook over an anvil, and a presser member which subsequently operates to press the point of the hook upon an anvil to offset the end of the hook.

These and other features of the invention are disclosed in the following specification and accompanying drawings, and are pointed out in the claims.

In the drawings,

Fig. 1 is a front view of a completed fishhook produced by the mechanism herein disclosed;

Figs. 2 to 10 illustrate a fishhook blank at various stages in the production of the completed hook, as follows:

Fig. 2 illustrating a blank cut from a piece of wire, Fig. 3 a blank having a point formed thereon, Fig. 4 a pointed blank which has been subjected to the first eyeing operation, Fig. 5 a blank having a formed eye, Fig. 6 a blank which has been barbed, Fig. 7 a blank after the first hook-forming operation, Fig. 8 a blank after the offsetting operation, Fig. 9 a blank after the swaging operation, and Fig. 10 a side view of the completed hook;

Fig. 11 is a plan view of a portion of the machine showing details of the wire-straightening mechanism;

Figures 1, 2, 3, 4, 5, 6, 7, 8, 9, 10, 11:
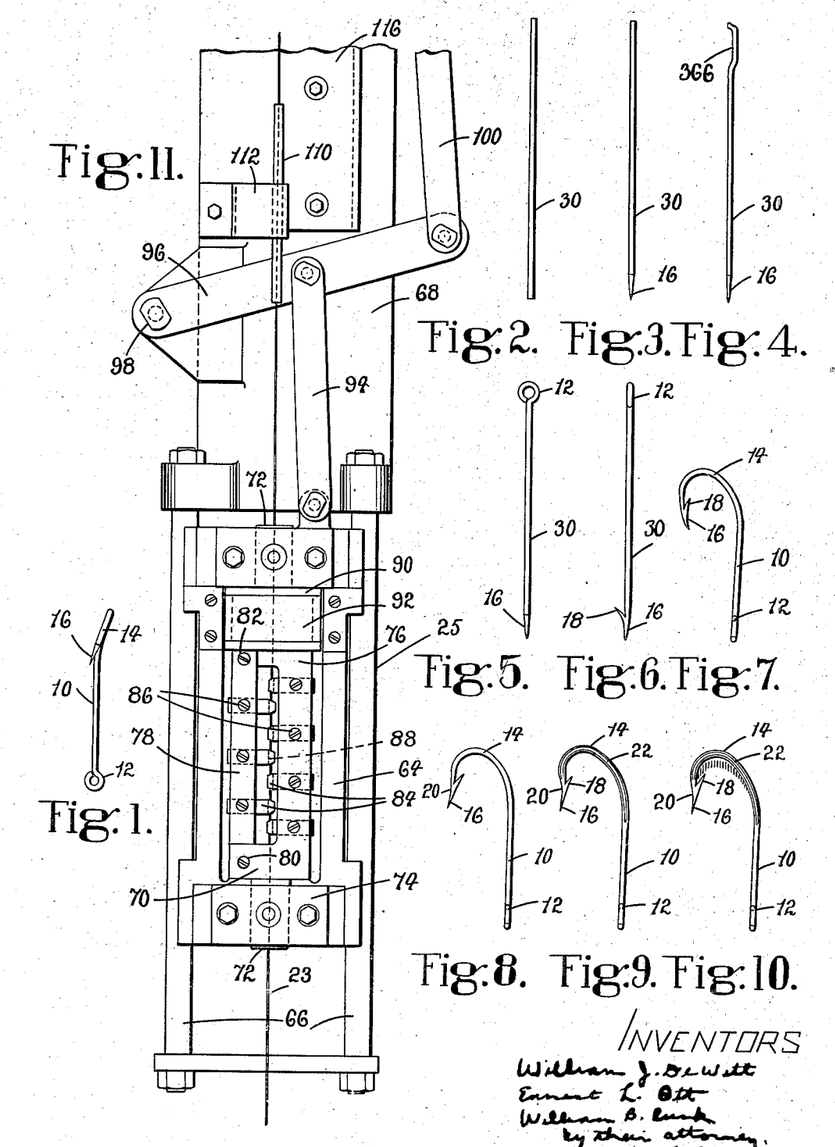

Figs. 1 and 10 illustrate a fishhook of the type produced by the machine of the invention. As shown, this hook, which is preferably formed of steel wire, comprises a shank 10 having an eye 12 at one end and bent to form a hook portion 14 at the other end, the hook portion terminating in a point 16. The hook portion is provided with a barb 18 and the point is bent outwardly in a reverse curve, as shown at 20. The hook portion 14 is swaged, as shown at 22 (Fig. 10), and is also bent laterally or kirbed, as shown in Fig. 1.

Figure 17:
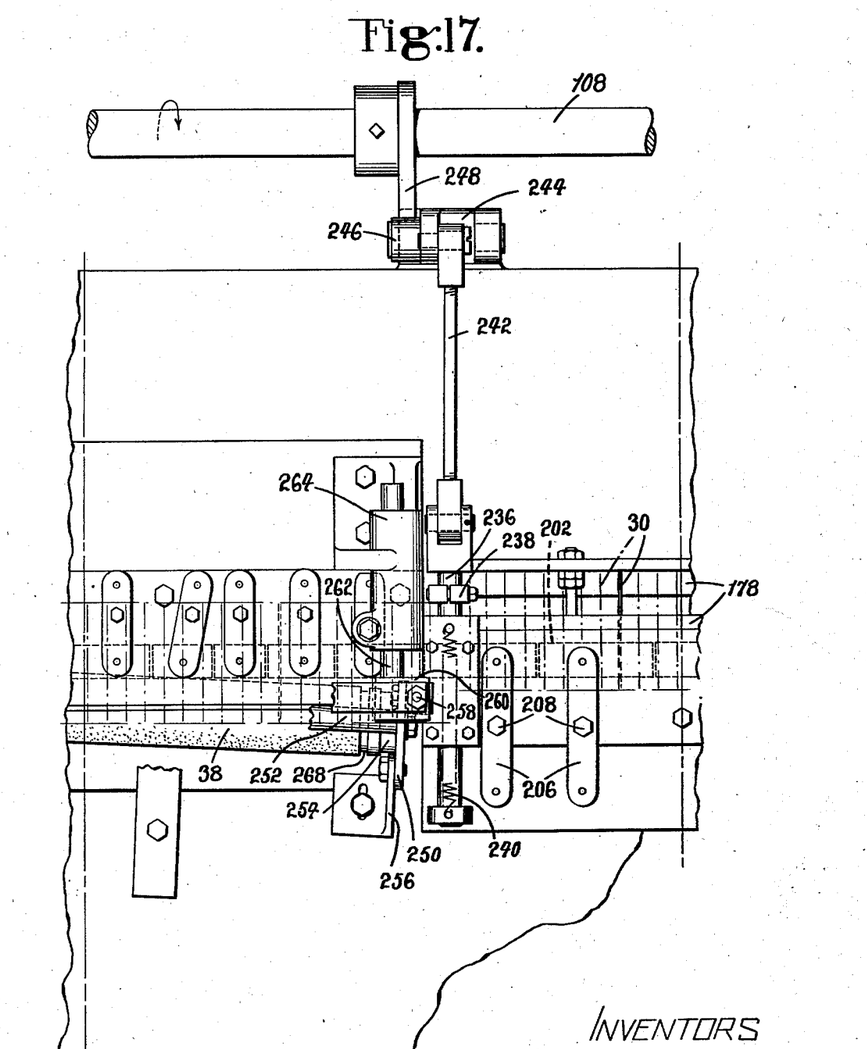
Fig. 17 is a plan view of a portion of the machine illustrating a portion of the conveying and pointing mechanism.
Figure 18:
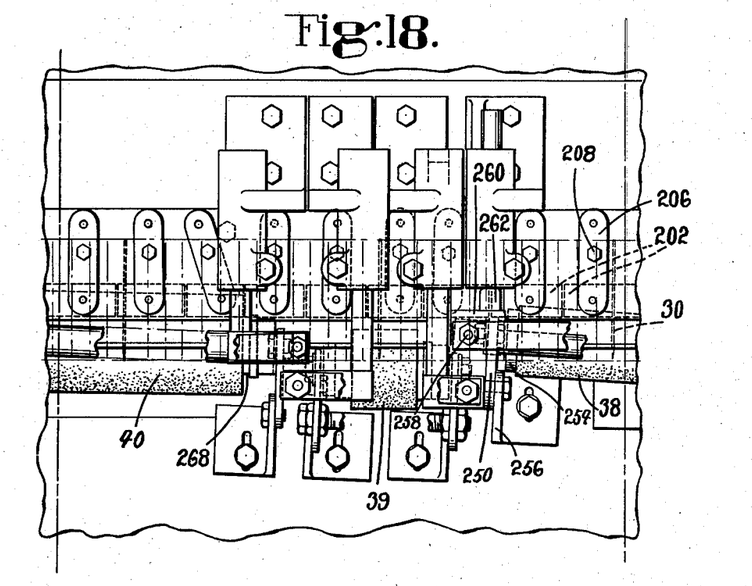
Fig. 18 is a plan view of a portion of the machine further illustrating the pointing mechanism.
Figure 20:
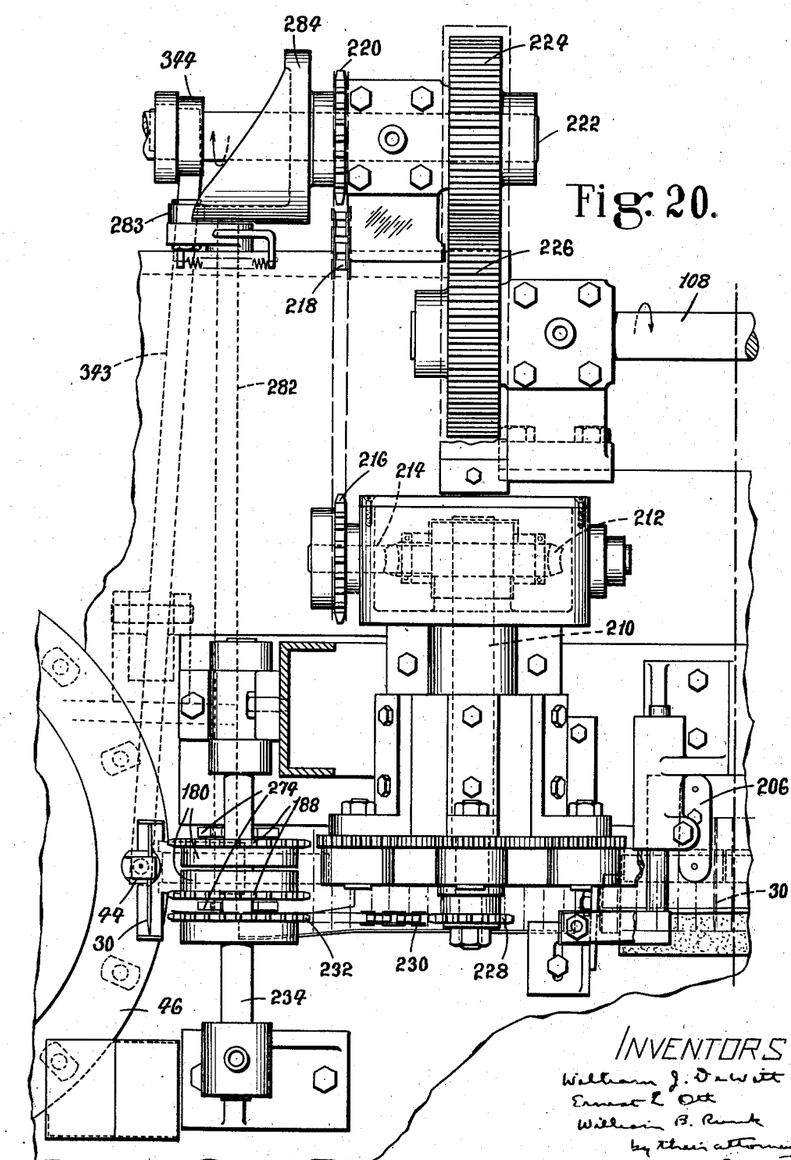
Fig. 20 is a plan view of a portion of the machine illustrating mechanism for driving various parts of the machine.
Figures 21, 22, 23:
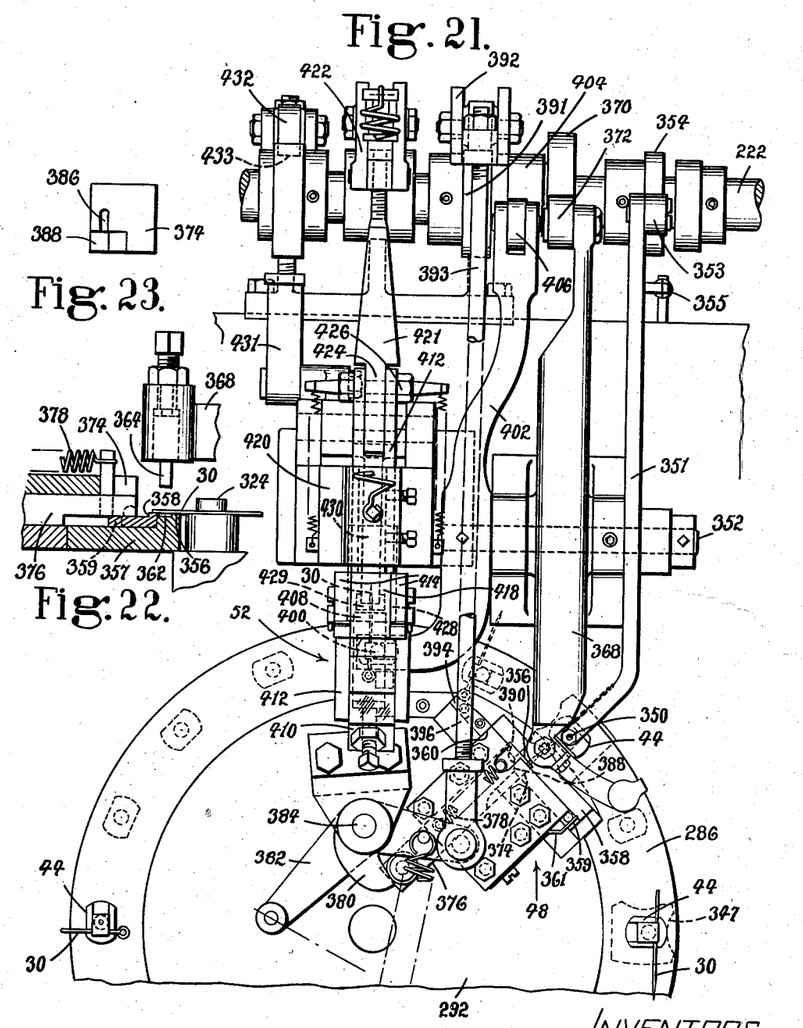
Fig. 21 is a plan view of a portion of the turret and the eyeing and barbing mechanisms.
Fig. 22 is a side elevation, partly in section, of the eye-forming mechanism.
Fig. 23 is an end view of the eye rolling tool.
Figure 24:
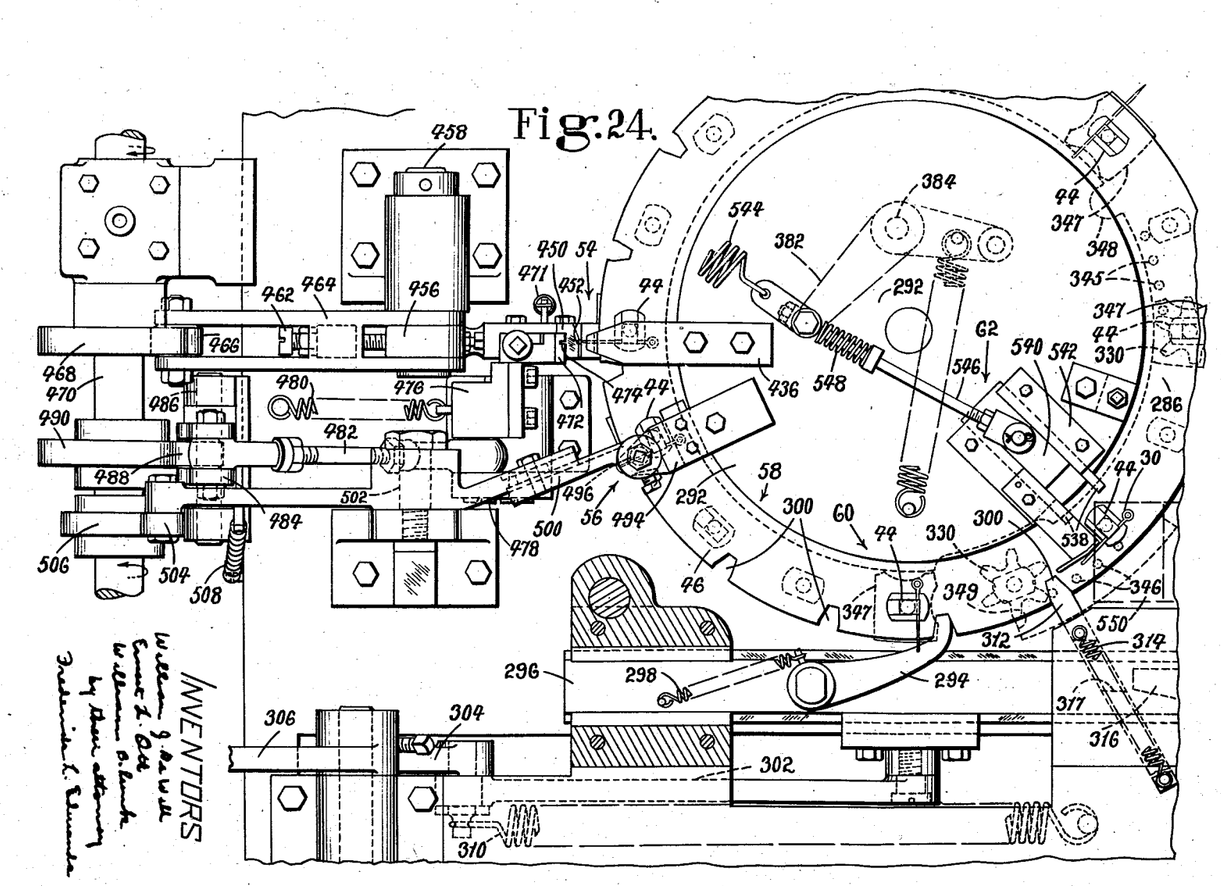
Fig. 24 is a plan view of a portion of the turret, the hook-forming mechanisms and the discharge mechanism.

In forming such a hook, wire 23 (Fig. 11) is intermittently advanced through a straightening device 25 by means of wire feed mechanism, including jaws 24 and 26 (Fig. 12) to cut-off mechanism, comprising a cutter disk 28 which severs the wire to form blanks 30 of suitable length, depending upon the size of the hooks to be produced. The blanks 30 are moved along a chute 32 (Fig. 14) onto a horizontal work support 34 and are advanced along the support by conveyors 36, past tapering and pointing mechanism including grinding rolls 38, 39, and 40 (Figs. 17 and 18). After leaving the pointing mechanism, the blanks are moved by a transfer device 42 (Fig. 15) to work-holding chucks 44 carried by a turret or dial 46 (Figs. 15, 20 and 21), which is rotated intermittently successively to present each blank to a plurality of operating instrumentalities, including eyeing mechanism 48 (Figs. 21, 22 and 23); barbing mechanism 52 (Fig. 21); hook-forming devices 54; offsetting mechanism 56 (Figs. 24 and 25); swaging mechanism 58 (Fig. 24); kirbing mechanism 60; and, finally, to a discharge station 62 (Fig. 24).

The wire-straightening mechanism 25 (Fig. 11), comprises a bracket 64 slidably mounted upon rods 66 carried by a portion 68 of the frame of the machine. The bracket carries a rotatable member 70 having hollow trunnions 72 mounted in bearings 74 in the bracket. The member 70 comprises an elongated casting 76 to which a bar 78 is pivoted at 80, the other end of the bar being secured to the casting by a screw 82. The bar and the casting are provided with a plurality of studs 84 extending in opposite directions partially across the space between the bar and the casting and held in position by set screws 86. The ends of the studs are provided with V-shaped notches 88, arranged to engage the wire 23 which passes through the trunnions 72 and between the bar and the casting. The rotatable member 70 has fixedly secured thereto a pulley 90 arranged to be driven by a belt 92 at a comparatively high speed. The bracket 64 is arranged to be reciprocated along the rods 66 by means of a link 94, which is connected to a lever 96 pivoted at 98 on the frame 68. The lever 96 is oscillated by a link 100 pivotally connected to a stud 102 carried by a connecting rod 104 (Fig. 12), which is arranged to be reciprocated by a stud 105 on a rotary cam plate 106 driven by a shaft 108. During operation, the studs 84 are rotated about the line of the feed of the wire 23, and at the same time are moved back and forth longitudinally of the wire over a considerable distance and exert pressure upon the wire to remove any curvature therefrom.

Figure 12:
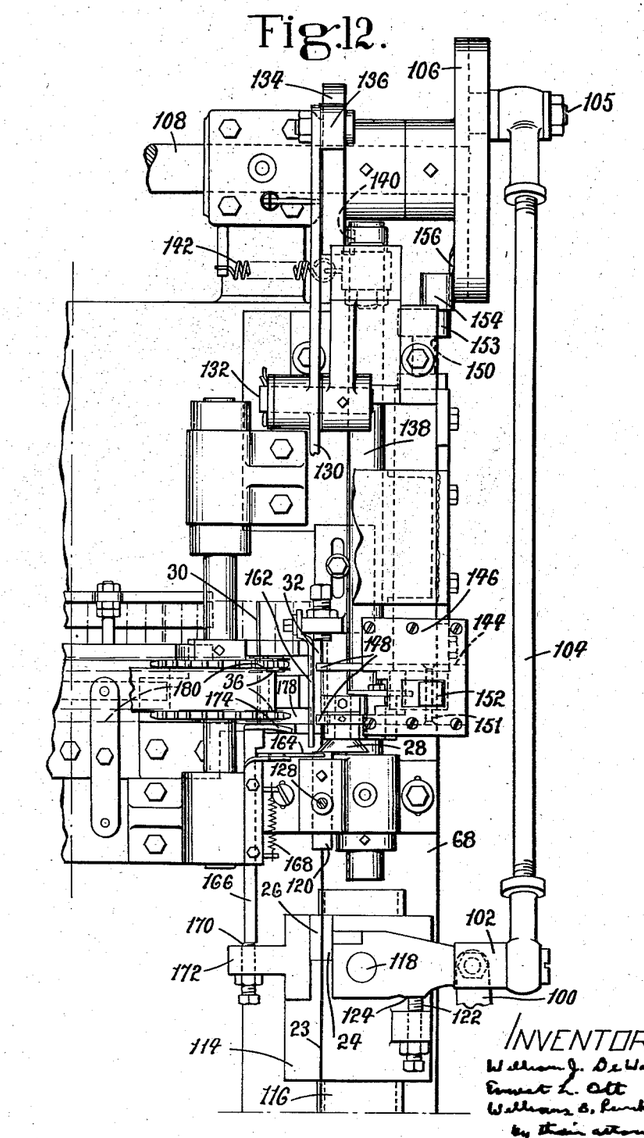
Fig. 12 is a plan view of a portion of the machine showing the wire-feeding and blank cut-off mechanism.

After passing through the straightening device, the wire 23 passes through a guide in the form of a hollow tube 110 carried in a bracket 112 on the frame 68 and thence to the feed jaws 24 and 26, shown in Fig. 12. These jaws are carried by a slide 114 mounted on a dovetail block 116, the jaw 26 being fixed to the slide and the jaw 24 forming part of the stud 102, which is mounted on a pivot 118 on the slide 114. The jaws are arranged to move the wire 23 from the wire straightener to a hollow quill 120, and, as the stud 102 is moved forwardly under the action of the connecting rod 104, the jaw 24 is moved about its pivot to grip the wire 23 against the face of the jaw 26, continued movement of the connecting rod being effective to move the slide 114 with the jaws and wire in a direction toward the quill. Upon return movement of the connecting rod 104, the jaw 24 is moved about its pivot to release the wire, and the slide 114 is moved rearwardly into position again to grip the wire at a location spaced from its initial gripping position by the length of a blank to be formed. This length is varied by adjusting the position of the stud 105 relatively to the center of the cam plate 106. In order to prevent crimping of the wire by the jaw 24 during rearward movement of the jaw, there is provided a stop in the form of a screw 122 arranged to engage an abutment 124 on the stud 102. This prevents the rearward side of the jaw from engaging the wire at an angle during its rearward movement.

Figure 13:
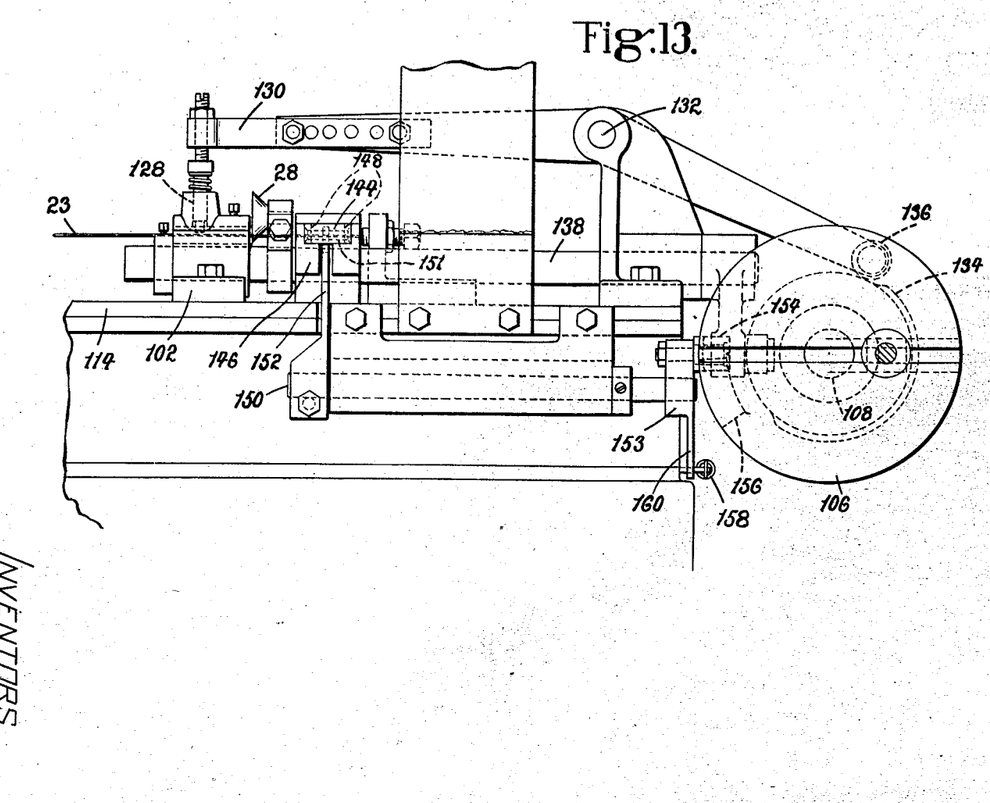
Fig. 13 is an end view of the blank cut-off and feeding mechanism.

The wire is held against rearward movement when the feed jaws are retracted by a plunger 128 (Figs. 12 and 13), carried by a lever 130 pivoted at 132 and operated at the proper time by a cam 134 on the shaft 108, the cam being arranged to engage a roll 136 on the lever 130 to effect depression of the plunger and cause it to engage and hold the wire positioned in the quill 120.

The blank cut-off mechanism comprises the cutting disk 28 mounted adjacent to the inner end of the quill 120 on a rock shaft 138. The rock shaft is arranged to be rocked to effect the severing of a blank from the wire 23, just after a feed movement of the wire, by means of a projection 140 on the cam 134. The shaft 138 is normally held by a spring 142 in such position that the cutter 28 is located at one side of the quill out of the line of feed of the wire.

After each blank is cut, it is moved to the chute 32 by mechanism comprising a plate 144 (Figs. 12, 13 and 14) slidably mounted upon a bracket 146 and having two feed fingers 148, arranged to move in a horizontal plane to engage a cut blank and to move it to the chute 32. The mechanism for operating the fingers comprises a rock shaft 150, having a forked lever 152 engaging a pin 151 in a slot in the plate 144 and carrying on its outer end a lever 153 having a roller 154 arranged to be engaged by a projection 156 on the cam 106. The feed fingers 148 are normally held in withdrawn position by a spring 158, which extends from the frame of the machine to a depending projection 160 on the lever 153.

Figure 14:
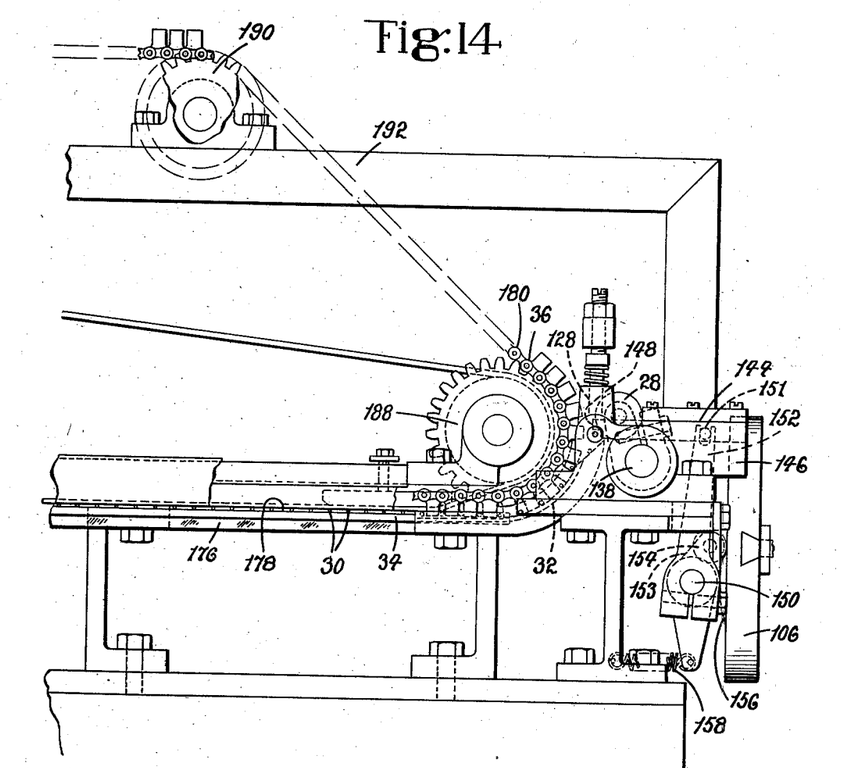
Fig. 14 is a view in side elevation, partly in section, of one end of the conveyor mechanism and the blank cut-off and feeding mechanism.
Figure 15:
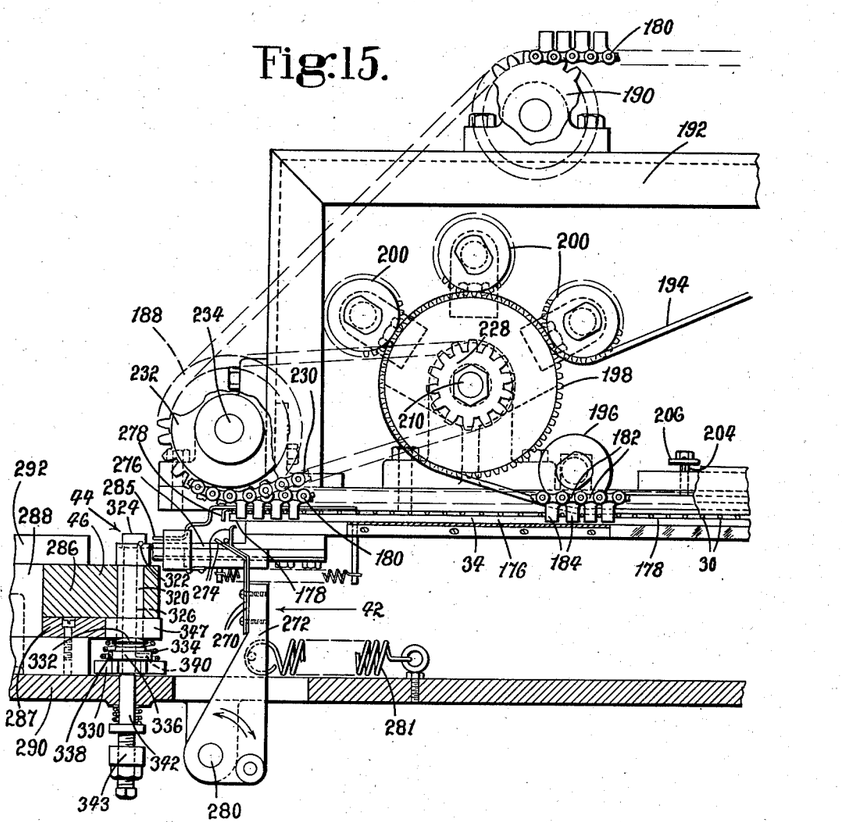
Fig. 15 is a view in side elevation, partly in section, of the outer end of the conveyor and a portion of the turret.
Figure 16:
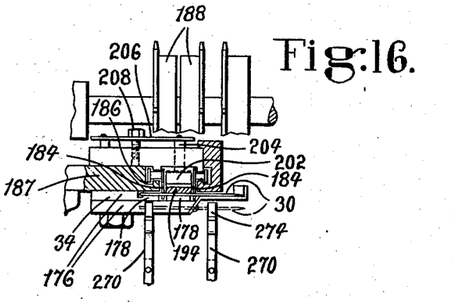
Fig. 16 is an end view, partly in section, of blank-feeding mechanism.

The blanks are guided downwardly along the chute by a plate 162, which overlies the surface of the chute. The blanks are positioned successively with their end portions in a predetermined position laterally of the conveyor belts 36 by means of a vertical plate 164 (Fig. 12), which is carried on a slide 166, the plate being urged forwardly by a spring 168. The plate 164 is moved rearwardly to position the blanks as they pass down the chute by means of an abutment in the form of a screw 170 carried on a bracket 172 on the slide 114. As the slide 114 is moved forwardly during a wire-feeding movement, the screw 170 engages the slide 166 to move it and the plate to the right in a blank-positioning operation. The lateral position of the screw 170 can be adjusted to render the positioning mechanism effective for various lengths of blanks. As the blanks pass down the chute, they engage a curved wall of a plate 174, which further locates them laterally of the chain belts in position to be advanced by the same along the work support 34 (Figs. 14, 15 and 16).

Figure 19:
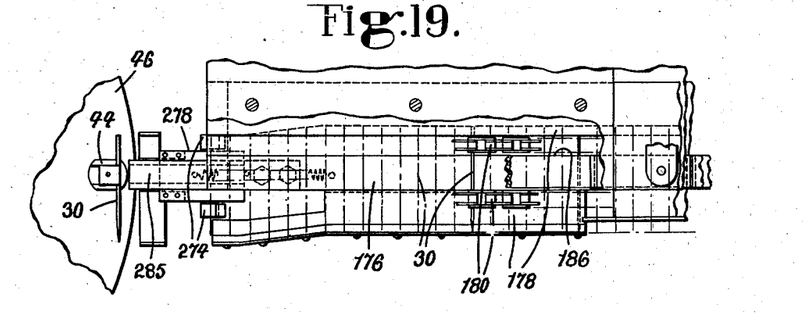
Fig. 19 is a plan view of the mechanism for transferring the blanks from the pointing mechanism to the turret.

The work support 34 extends horizontally from the chute 32 to a point adjacent to the turret 46, and comprises horizontally extending plates 176 (Fig. 15) having spaced ledges 178 along which the blanks 30 are advanced. The conveyor for moving the blanks along the support past the pointing mechanism comprises two spaced sprocket chains 180 composed of links 182, best shown in Fig. 15, each of which has an outwardly extending feed finger 184. The chains are so arranged as to pass along spaced grooves 186 (Figs. 16 and 19) in a horizontal frame bracket 187 and adjacent to the ledges 178 to advance the blanks one at a time from the chute along the ledges. The chains 180 extend along the support 34, passing over sprockets 188 at each end of the support, and then upwardly over idlers 190 located above the support 34 upon a bracket 192. In order to hold the blanks 30 down upon the ledges 178 and to rotate them as they are advanced by the feed fingers 184 past the pointing mechanism, there is provided a belt 194 (Fig. 15), which extends over the central portion of one of the sprockets 188 at an end of the machine along and above the ledges 178 from a point near the chute 32 to a point somewhat beyond the grinding roll 40, then past an idler 196, over a pulley 198, past three idlers 200, over another idler (not shown), and back to the sprocket 188. The belt 194 is pressed down upon the blanks 30 by a series of blocks 202 (Fig. 17), which are forced against the inner face of the belt by plungers 204 (Fig. 15) under action of leaf springs 206 secured to the frame of the machine by bolts 208 (Fig. 16).

The belt pulley 198 (Fig. 15) is driven by a shaft 210 by means of reduction gearing, including a worm wheel 212 (Fig. 20) and worm shaft 214, which in turn is connected to the main drive shaft 108 by a sprocket 216, chain belt 218 and sprocket 220 mounted upon a shaft 222 having a gear 224 in mesh with a gear 226 on the shaft 108. The shaft 210 also has a sprocket 228 and a chain 230 passing over a sprocket 232 on a shaft 234, which carries the sprockets 188 for driving the chains 180.

In order to ensure that the blanks 30 are fed past the grinding rolls with their ends located relatively thereto in predetermined position to produce the desired taper, there is provided a positioning device which, as shown in Fig. 17, comprises a plunger 236 which carries an abutment 238, arranged to be moved transversely of the path of feed of the blanks 30 to engage their ends and force them outwardly by a uniform distance. The plunger is normally held in retracted position by a spring 240, and is periodically advanced against the tension of the spring by means of a link 242, making pivotal connection with a bell crank lever 244 carrying a roll 246, arranged to be engaged intermittently by a cam 248 carried by the main shaft 108.

The grinding rolls 38, 39 and 40 are positioned below the surfaces of the work support 34, and are carried by brackets which are adjustable in such manner that the axes of the rolls can be shifted in the horizontal and vertical planes. The mountings for the rolls are similar, and, consequently, only that for the roll 38 will be described. As shown in Figs. 17 and 18, this mounting comprises a frame, including two substantially vertical members 250 connected by a brace 252, and supporting the roll shaft 254. The frame is connected by a bolt and slot connection to an upstanding portion of a bracket 256, which is secured to the frame of the machine. The members 250 are secured by a bolt and slot connection to the lower ends of screw bolts 258, carried by blocks 260 on rods 262 slidably mounted in brackets 264, also secured to the frame on the other side of the line of feed of the blanks. This construction is such that either end or both ends of the roll can be adjusted both heightwise and longitudinally of the work support 234. The grinding rolls 38, 39 and 40 are used, respectively, to put a long preliminary taper on one end of the blank, to form a sharp point, and to provide a finishing bevel to remove the shoulder between the first two tapering operations. It has been found that the best adjustment of the rolls is one in which the right-hand end of the roll 38 is moved at an angle of about 15° outwardly in the horizontal direction from the line of feed of the blanks, and downwardly through a similar angle below the plane of the blanks. The roll 39, which produces the sharp points on the blanks, is positioned with its cylindrical face substantially parallel to the line of feed of blanks or only slightly at an angle thereto, whereas roll 40 is positioned at an angle to the line of feed somewhere between that of roll 38 and roll 39. The rolls are arranged to be driven by belts 268. As the feed fingers 184 advance the blanks past the rolls 38, 39 and 40, the belt 194 rolls them along the ledges 178, so that they are rotating during their engagement with the grinding surfaces of the rolls. This avoids producing flat spots on the shank of the blanks during the grinding operation.

After the blanks 30 pass the grinding rolls, they are advanced by means of the feed fingers 184 to the transfer mechanism 42. The transfer mechanism comprises two plates 270 (Fig. 15) secured to an arm 272, the ends of the plates being separated to form V-shaped jaws 274. The plates are spaced upon opposite sides of a table 276, upon which the blanks are dropped from the ends of the ledges 178 which extend over the table, the blanks being guided downwardly by a downturned plate 278 so that they will fall between the jaws 274. The arm 272 is arranged to be oscillated about a pivot 280 against the tension of a spring 281, by means of a rock shaft 282 (Fig. 20), carrying a roll 283 in engagement with a cam 284 on shaft 222, and operative to effect movement of the jaws 274 with a blank therein outwardly over the table 276 successively to present blanks to chucks 44 in position adjacent to the table. During outward movement of the jaws, the position of the blank is controlled heightwise by a spring plate 285.

The mechanism for transferring the blanks 30 from one operating station to another comprises the turret or dial 46 (Figs. 15, 21 and 24), upon which can be mounted sixteen chucks 44 equally spaced along its periphery. The dial is in the form of a ring 286 resting upon a circular plate 287 and rotatable about the axis of a sleeve 288 carried by a flat bed 290, the upper portion of the sleeve constituting a fixed table or plate 292. The dial is rotated intermittently by a pawl 294 (Fig. 24) carried by a slide 296 and arranged under action of a spring 298 to engage spaced notches 300 in the outer side walls of the dial. The slide 296 is reciprocated by a system of levers 302, 304 and 306, and is moved in one direction by a cam 308 (Fig. 27), and in the other direction by a heavy spring 310, the arrangement being such that the spring effects feeding movement of the pawl so that if any of the parts become jammed the spring will yield, thereby preventing breakage of the parts. There is a retractable stud 312 normally forced toward the dial by a spring 314 to engage any one of the notches 300 and to lock the dial fixed in each indexed position at the end of each forward movement of the slide and pawl. During the time that the dial is at rest, operation upon the blanks occurs and the slide 296 is retracted, removing the pawl 294 from the notch which it engages. At the beginning of the next forward movement of the slide, a cam 316, carried thereby, engages a surface on the stud 312 and retracts the same to release the dial for rotation.

Each of the chucks 44 comprises a vertical sleeve 320 (Fig. 15), mounted upon the dial and having its upper surface grooved at 322 to constitute one jaw of a blank-receiving and holding device. The other jaw comprises a plate 324 carried at the upper end of a spindle or rod 326, which extends downwardly through the sleeve and is screw threaded into the hub of a sprocket wheel 330. The jaws are normally forced toward each other by two cup springs 332 positioned between the sleeve 320 and the hub 328, and by a light coil spring 334 extending between the under side of the ring 286 and the sprocket. In order to prevent turning of the rod 326 relatively to the sleeve 320 when the chuck itself is turned, there is a leaf spring 336 secured by a screw 338 to the hub and having a plunger 340 extending into frictional engagement with the rod.

At the blank-receiving station the frame beneath the dial carries a spring pressed plunger 342 (Fig. 15), operated by a lever 343 (Fig. 20), and a cam 344 to engage the rod 326 and move it upwardly to raise the plate 324 above the sleeve 320, so that a blank can be located between the jaws of the chuck.

It is desirable that each blank be securely held in the chuck jaws during the operations performed upon the blank and in moving from one station to another, thus making it possible to present the blanks accurately to the various operating instrumentalities. Accordingly, after the blank 30 is presented to the jaws of a chuck 44, the blank is loosely held therein by the operation of the light spring 334. However, to ensure that the blank will be firmly held during movement from one station to another and during operations performed thereon, means is provided for increasing the spring pressure forcing the jaws together. This is accomplished by means of a series of pins 345 (Fig. 24) on the frame arranged to engage the sprocket wheel 330 and to rotate it on the threaded end of the rod 326 in a direction to increase the spring pressure of the cup springs 332, there being a second series of pins 346 near the discharge station to rotate the wheel in the opposite direction to relieve the clamping pressure of the jaws after the operations upon the blank have been completed and just prior to discharge thereof.

After leaving the receiving station it is desired to turn the chucks through 90°, so that the blanks will extend substantially radially of the dial with their pointed ends disposed outwardly. This rotation is effected by means of a cam plate 347 secured to the sleeve 320 and arranged to engage a cam surface 348 on the ring (Fig. 24). The chucks are rotated again, this time being reversed through 90° near the discharge station 62, by engagement of the cam plate 347 with a cam surface 349 on the ring.

After a blank 30 has been clamped in the chuck 44 and moved to the eyeing instrumentalities at 48 (Fig. 21), further clamping pressure is applied to the upper plate or jaw 324 by a holddown member comprising a stud 350 carried upon one end of a rocking lever 351, pivoted upon a shaft 352, the other end of the lever having a roll 353 in engagement with a cam 354 on shaft 222, effective to depress the holddown member against tension of a spring 355.

When initially located at the eyeing station, the butt end of a blank 30 is positioned above and close to a ledge 356 (Fig. 22) on the upper surface of a bracket 357 secured to the table 292, with the inner end of the blank positioned above a ledge 358 on a slide 359 on the bracket 357, the slide being normally held to the left against an abutment 360 (Fig. 21) on the bracket by a spring 361. The bracket 357 has a shallow recess 362 between the two ledges forming a female die, and positioned above the recess is a plunger 364 cooperable therewith to form a shallow U-shaped depression 366 (Fig. 4) in the butt end portion of the blank as the first step of the eyeing operation. The plunger is carried by one end of a lever 368 pivoted on the shaft 352 and is arranged to be depressed by a cam 370 engaging a roll 372 on the other end of the lever.

After a depression is formed, the end of the blank is rolled over to complete the eye 12 of the hook. To this end, there is provided a forming tool 374 (Figs. 21, 22 and 23) mounted upon a slide 376 in the bracket 357. The slide is arranged to be moved outwardly of the plate 292 against the action of a spring by an arm 380 on a bell crank lever 382 mounted upon a stud 384 on the plate 292. The tool 374 has a curved recess 386, extending substantially in a vertical plane, the walls of which are arranged to contact the U-shaped end of the blank to bead or roll it over to form a circular eye 12. As the tool moves toward the blank to complete the formation of the eye, an abutment 388 (Figs. 21 and 23) on the tool engages an inclined surface 390 on the slide 359 to move the die member 356 out of the path of movement of the tool. Movement of the slide 376 is controlled by a cam 391 on the shaft 222, which oscillates a lever 392 connected by a rod 393 to the bell crank 382.

After the eyeing operation, the blank is moved to the barbing station at 52. However, since the barbing operation is conveniently performed on the blank at a point 90° from the plane of the eye, it has been found desirable to rotate the blank through that angular distance. Accordingly, there is a wedge cam 394 located just beyond the eyeing station, and positioned in the path of the blank beneath the eye, arranged to engage the eye to rotate it, against clamping pressure of the springs 332, from a vertical to a horizontal plane. At the same time, a curved vertical wall, or cam, 396 moves the blank outwardly a short distance to position its pointed end for the barbing operation.

At the barbing station it is essential that the blank be held especially firmly in order that the cutting tool can perform accurately. Consequently, additional pressure is applied to the upper clamping jaw 324 by a plunger 400, carried by a lever 402 on the shaft 352 and arranged to be operated by a cam 404 which engages a roll 406 on the lever. The barbing tool comprises a chisel 408 mounted for longitudinal adjustment in a bracket 410 carried by a rocking member 412, the chisel being positioned to extend downwardly and outwardly of the work support with its edge in a horizontal plane. The member 412 is connected by links 414 to a projection 418 on a fixed bracket 420 and is arranged to be oscillated by a lever 421 operatively connected to an eccentric lever 422 on the shaft 222 adjustably connected to the member 412 by a slotted plate 424 and bolt 426 by which the stroke of the chisel can be adjusted. There is provided an anvil 428 upon which the outer end of the blank bears during the barbing operation, and a retractable holddown 429 for engaging the point of the blank during the operation to hold the blank on the anvil against lateral movement. The holddown is actuated by a rod 430 connected to a rock lever 431 carrying a roll 432 engaging a cam 433 on the shaft 222. In operation, the driving mechanism imparts an oscillating movement to the chisel, causing it to cut a sliver in the blank to form the barb 18 near the end thereof.

Figure 25:
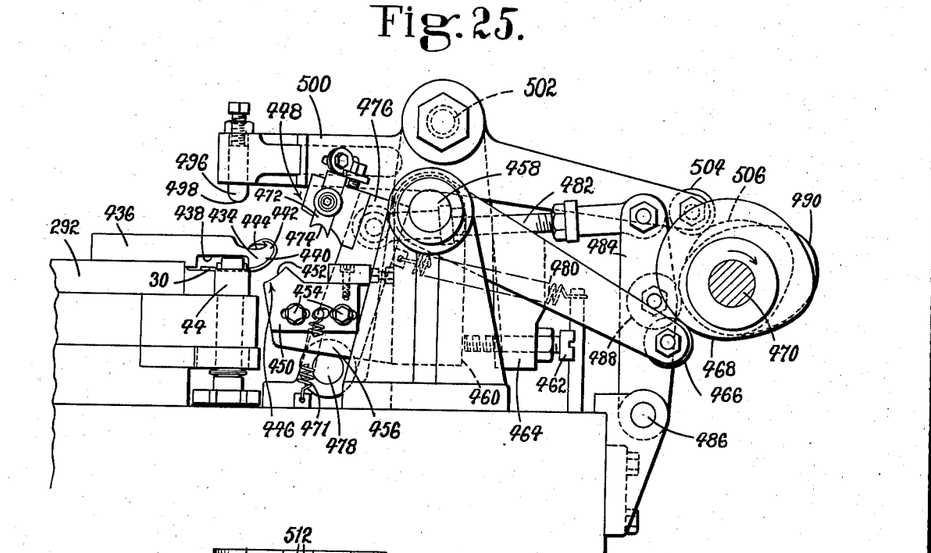
Fig. 25 is a side elevation showing a portion of the hook-forming mechanism.

The first hook-forming operation takes place at station 54 (Figs. 24 and 25). At this station there is located an anvil 434, having a shank 436 secured to the table 292, the shank being arranged closely to overlie a chuck 44 when positioned at this station, there being a recess 438 in the underside of the shank to permit passage of the chucks. The outer end 440 of the anvil is curved outwardly and upwardly to correspond to the curvature to be imparted to a hook, and itself terminates in a hooked portion 442 to form the curve of the hook adjacent the barb. The upper surface of the anvil has a recess 444 to receive the point of the blank when it is bent over the anvil. The means for bending the blank about the anvil comprises a bottom former 446 and a top former 448. The bottom former 446 comprises a plate 450 having a curved recessed blank contacting surface 452, the member being adjustably secured by bolts 454 to a rocking lever 456 mounted on a shaft 458. The lever has a tail portion 460 arranged to be engaged by an adjustable abutment 462 carried by a lever 464 also mounted on the shaft 458 and having a roll 466 engaging a cam 468 on a drive shaft 470, there being a spring 471 to hold the roll against the cam. The top former comprises a plate 472, having a curved recessed portion 474, adjustably mounted on an arm 476 pivoted on a shaft 478. The arm is arranged to be moved inwardly against the tension of a spring 480 by a connecting rod 482 extending to a link 484 on a shaft 486, the link having a roll 488 engaging a cam 490 on the drive shaft 470. The timing of the cams 468 and 490 is such that the bottom former is first moved into engagement with the blank to bend it partly about the anvil, and then is relieved somewhat, after which the top former commences to bend the pointed portion of the blank over the anvil, and then both formers are moved to complete the bending operation to form the hook portion 14 of the blank, as shown in Fig. 7.

The partially formed blank is then moved to the station at 56 (Fig. 24), where the point of the hook is offset. At this station the blank is positioned with its point overlying an anvil 494, the upper portion of which is similar in shape to the anvil 434. A plunger 496 having a rounded work-engaging portion 498 (Fig. 25) is brought down upon the point of the blank to produce a reverse curve therein, as shown at 20 in Fig. 8. The plunger is mounted upon a rocking lever 500, pivoted on a shaft 502 and having a roll 504 engaging a cam 506 on the drive shaft 470, the roll being held against the cam by a spring 508 (Fig. 24).

Figure 26:
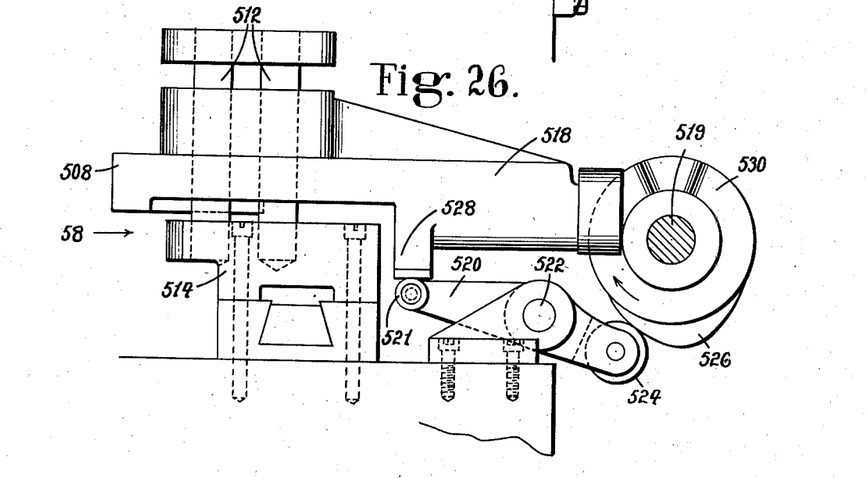
Fig. 26 is a side elevation of mechanism for swaging hooks.
Figure 27:
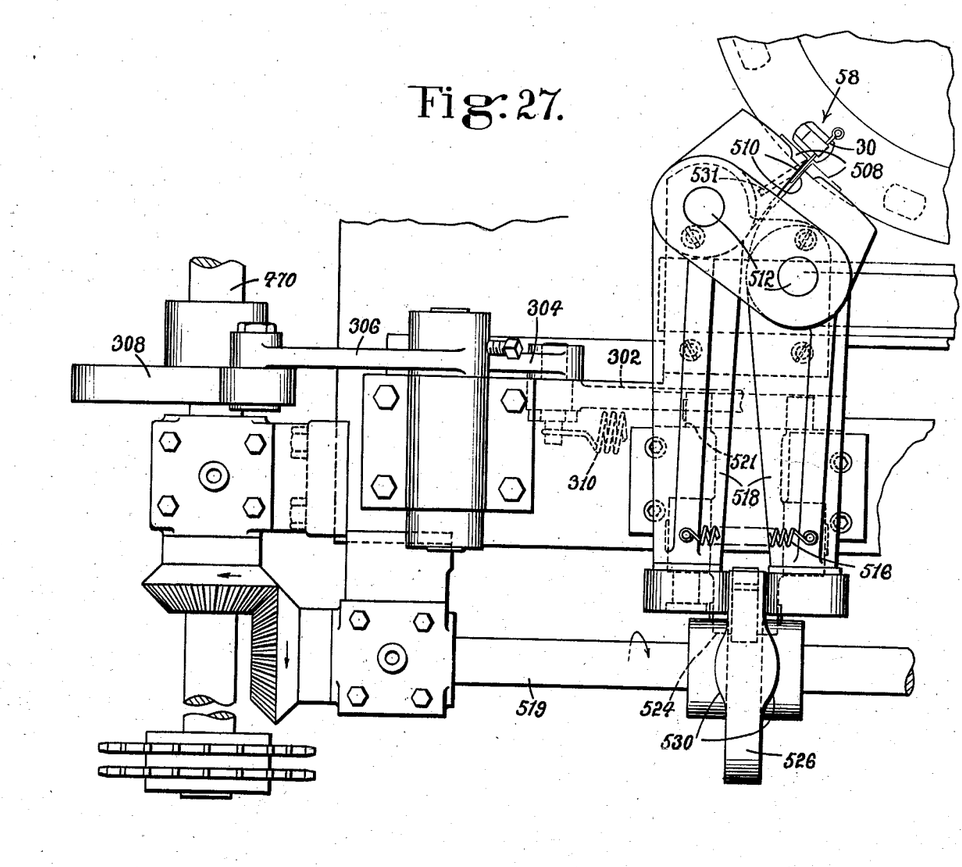
Fig. 27 is a plan view of the swaging mechanism.

A swaging operation, which is performed at station 58, consists in flattening the sides of the formed blank along the hooked portion thereof. The kirbing operation, which is performed at station 60, consists in twisting the hook portion relatively to the shank. The swaging and the kirbing mechanisms are similar, except for the shape of the work-engaging jaws. The swaging mechanism, as shown in Figs. 26 and 27, comprises two jaws 508 having flat vertical work-engaging faces 510. Each jaw is slidably mounted upon a vertical pivot 512 carried by a bracket 514, the jaws normally being held apart by a spring 516 extending between rearwardly projecting arms 518. The jaws are raised on their pivots, to permit insertion and removal of a blank relatively to the jaws, by a lever 520 pivoted on a shaft 522 and having a roll 524 at one end in engagement with a cam 526 on a shaft 519 driven by connections with shaft 470 (Fig. 27). The other end of the lever 520 has a roll 521 arranged to engage a projection 528 on the arms 518 to raise the jaws to permit location of the blank and then to permit them to drop, after which cams 530 on the shaft 519 engage rolls upon the ends of the arms 518 to close the jaws, thereby applying pressure to effect the swaging or the kirbing operation. The work-engaging jaws of the swaging mechanism are flat and vertically arranged to produce the flat portions on the blanks. The work engaging faces of the jaws of the kirbing mechanism are flat and, as indicated by dotted lines 531 (Fig. 27), are inclined slightly to a vertical plane through the shank of a hook presented thereto, thereby to bend the hook portion of the blank slightly askew.

After the now completed blank leaves the kirbing station, the cam 349 rotates the chuck 44 through 90° into the position shown at the discharge station 62, and the pins 346 rotate the sprocket 330 in a direction to relieve the pressure of the spring cups 332.

The discharge mechanism comprises a pair of fingers 538 (Fig. 24) on a slide 540 mounted in a bracket 542 on the table 292. The slide is normally held in withdrawn position by a spring 544 connected to it by a rod 546 and is moved outwardly at the proper time by the bell crank 382, which acts upon the rod through a spring 548. Upon outward movement of the slide, the fingers 538 engage the completed hook at portions extending from opposite sides of the chuck and remove it from the chuck against the pressure of the light spring 334, after which the hook drops into a discharge chute 550.

Having described our invention, what we claim as new and desire to secure by Letters Patent of the United States is:

1. In a fishhook making machine, a wire-straightening device, wire-feeding mechanism intermittently operable to advance wire through the wire-straightening device by distances corresponding to predetermined lengths of blanks to be formed from the wire, means for successively cutting a plurality of blanks of the predetermined lengths from the wire, a plurality of grinding wheels, means for advancing the cut blanks past the grinding wheels and for rotating them as they are advanced thereby to form a point on one end of each blank, a dial, a plurality of chucks having blank-clamping jaws carried by the dial, means for feeding pointed blanks one at a time to the chucks, a plurality of blank-forming instrumentalities positioned peripherally of the dial, and means for rotating the dial about its axis successively to present each blank to the operating instrumentalities for completing the formation of a fishhook from the blank.

2. In a machine for operating upon wire blanks, a dial, a blank-supporting device carried by the dial comprising a sleeve, the upper end of which terminates in a jaw, a spindle slidably mounted in the sleeve, one end of which terminates in a jaw cooperable with the first-mentioned jaw to hold a blank in fixed position, the other end of the spindle being screw-threaded, a sprocket on the screw-threaded end of the spindle, a spring located between the sprocket and the sleeve for exerting clamping pressure upon the jaws to hold a blank in position during operation thereon, a second spring between the sprocket and the sleeve normally operative to exert sufficient pressure upon the jaws to retain a blank in position therebetween during movement of the dial, a plurality of operating stations located around the dial, means for intermittently advancing the work-holding device from one station to another, means for rotating the sprocket to increase the pressure of the first-mentioned spring upon the jaws, and means subsequently operable to rotate the work-holding device about the axis of the spindle.

3. In a fishhook making machine, a dial mounted for rotation about its axis, a plurality of work-holding devices mounted upon the dial having each a pair of spring-pressed clamping jaws, means for intermittently moving the dial about its axis to present the work-holding devices successively to a plurality of operating stations, means for opening the jaws at one of the stations, means located at the same station for presenting a blank to the jaws of a work-holding device located at the station, means for applying increased pressure to the jaws to grip the blank securely therebetween prior to presentation of the blank to the first operating station, means for releasing a substantial amount of spring pressure upon the jaws after a series of operations has been performed upon a blank positioned in a particular work-holding device, and an ejecting means subsequently operable to force the blank from the jaws against the remaining spring pressure to eject the blank from the machine.

4. In a fishhook making machine, a plurality of operating instrumentalities, a work-holding device comprising a sleeve terminating in a fixed jaw, a plunger extending through the sleeve and carrying at its upper end a movable jaw, a light spring normally urging the jaws toward each other, means for separating the jaws for permitting insertion of a blank, means for increasing the pressure of the jaws upon the blank after a blank has been located therein, means for moving the work support from one operating instrumentality to another, and means for rotating the work-holding device through an angle of 90° in passing from one of the operating instrumentalities to another to position the blank properly for a subsequent operation.

5. In a fishhook making machine, a dial rotatable about a vertical axis, a plurality of instrumentalities for operating upon fishhook blanks located about the periphery of the dial, a plurality of work-holding devices mounted upon the dial, means for moving the dial intermittently to present the work-holding devices successively to the various operating instrumentalities, each of the work-holding devices comprising a pair of jaws arranged to hold a fishhook blank in horizontal position, and cam-operated mechanism for rotating each work-holding device about its vertical axis between two of the operating instrumentalities.

6. In a fishhook making machine, a table, a dial mounted for rotation about the axis of the table, a plurality of instrumentalities operating upon fishhook blanks located about the axis of the table, a work-holding chuck rotatably mounted upon the dial and comprising a vertical sleeve terminating in a fixed jaw and a spindle mounted in the sleeve and having a movable jaw cooperable with the first-mentioned jaw, resilient means normally operative to force the jaws together to grip a fishhook blank and hold it in a horizontal position, a cam-controlled lever for effecting movements of the spindle to open and close the jaws, and means for rotating the chuck through 90° during movement thereof from one instrumentality to another.

7. In a fishhook making machine, a table, a dial mounted for rotation about the axis of the table, a plurality of operating instrumentalities located along the periphery of the dial, a work-holding device mounted upon the dial and comprising a vertical sleeve, a spindle slidably mounted in the sleeve and terminating in a screw-threaded end portion, the upper end of the sleeve and the spindle terminating in cooperable jaws, a sprocket wheel mounted upon the screw-threaded portion, springs located between the sprocket wheel and the sleeve normally operative to force the spindle in a downward direction to close the jaws, automatic means for raising the spindle to open the jaws for insertion of a blank, pins carried by the table arranged for engagement with the sprocket to effect an increase in the pressure of the springs, a cam carried by the table for engaging a portion of the sleeve to rotate the work-holding device about its vertical axis, and a plurality of pins carried by the dial arranged subsequently to rotate the sprocket in a direction again to release the spring pressure.

8. In a fishhook making machine, a rotatable dial, a plurality of instrumentalities for operating upon fishhook blanks located along the periphery of the dial, a plurality of chucks mounted upon the dial, means for intermittently advancing the dial successively to present the chucks to the various instrumentalities, each of the chucks comprising a pair of jaws normally operative to clamp a fishhook blank in horizontal position, means located at one side of the dial for feeding blanks to the chucks when they are located in position adjacent thereto, means for rotating the chucks about their vertical axes during movement of the chucks between two of the operating instrumentalities, and a pair of fingers located at a discharge station arranged to engage a blank positioned in the chuck and forcibly to remove it from the jaws.

9. In a fishhook making machine, a table, a dial mounted for movement about the axis of the table, a plurality of instrumentalities cooperating upon fishhook blanks located about the axis of the table and adjacent to the dial, a plurality of work-holding chucks mounted upon the dial, means for intermittently advancing the dial to move the chucks from one instrumentality to another, each of the chucks comprising a plurality of clamping jaws for receiving and holding a fishhook blank in horizontal position, one of the instrumentalities comprising feeding mechanism operable successively to present fishhook blanks to the chucks, means adjacent to the feeding mechanism for opening the jaws of a chuck located adjacent thereto and operable to close the jaws upon the blank after the latter has been positioned therein, and means for rotating each chuck bodily about its vertical axis during movement of the same between two of the operating instrumentalities.

10. In a fishhook making machine, a table, a dial mounted for rotation about the axis of the table, a plurality of mechanisms for operating upon fishhook blanks equally spaced angularly about the axis of the table adjacent to the dial, a plurality of work-holding devices mounted upon the dial and equally spaced along the periphery of the dial, means for intermittently advancing the dial thereby to present the work-holding devices with blanks positioned therein successively to the various mechanisms, means operable successively to feed blanks to the work-holding devices, and means for rotating the devices through an angle of 90° relatively to the dial during movement of the dial between two of the mechanisms.

11. In a fishhook making machine, a table, a dial mounted for rotation about the axis of the table, a plurality of mechanisms spaced along the periphery of the dial for operating on fishhook blanks, a plurality of equally spaced work-holding devices mounted upon the dial for successively presenting blanks to the mechanisms, each of the work-holding devices comprising a pair of cooperating jaws, means normally operative to cause the jaws to clamp a blank in fixed position relatively to the device, and means for rotating each of the devices through 90° during movement of the dial between two of the mechanisms.

12. In a fishhook making machine, a work support for holding a fishhook blank, a slide, a die member carried by the slide, a plunger movable to force the end of the blank into engagement with the die member to crimp the blank, a slide arranged for movement at right angles to the first-mentioned slide, a die carried by the second-mentioned slide and having a curved recess extending in a vertical plane for rolling the crimped portion of the blank upon itself to form an eye, and a cam carried by the last-mentioned slide for moving the first-mentioned slide laterally during the rolling operation.

13. In a fishhook making machine, a movable suppport, a plurality of work-holding devices located upon the support and having each means for holding a fishhook blank in horizontal position, means located adjacent to the support for producing a forming operation upon a blank presented thereto and comprising a pair of jaws, means for moving the work support intermittently successively to present the work-holding devices with blanks in position for the forming operation, means for opening the jaws and raising them out of the path of movement of the work-holding devices during their movement, and means operable subsequently thereto for lowering the jaws and closing them upon the blank.

14. In a fishhook making machine, a dial, a plurality of blank-holding devices carried by the dial having each clamping means for holding a blank in horizontal position, a hook-shaping device located along the periphery of the dial and comprising two vertical pivots, forming jaws rotatably and slidably mounted upon the pivots, means for successively moving the work-holding devices into position adjacent to the jaws, means for raising the jaws upon their pivots during movement of the work-holding devices and for lowering the jaws after a work-holding device is in position, and means for closing the jaws to produce a forming operation upon the blank.

WILLIAM J. DE WITT.
ERNEST L. OTT.
WILLIAM B. RUNK.